Dec. 19, 1967 A. W. ORLACCHIO 3,359,441
ACCELEROMETER
Filed Nov. 16, 1959
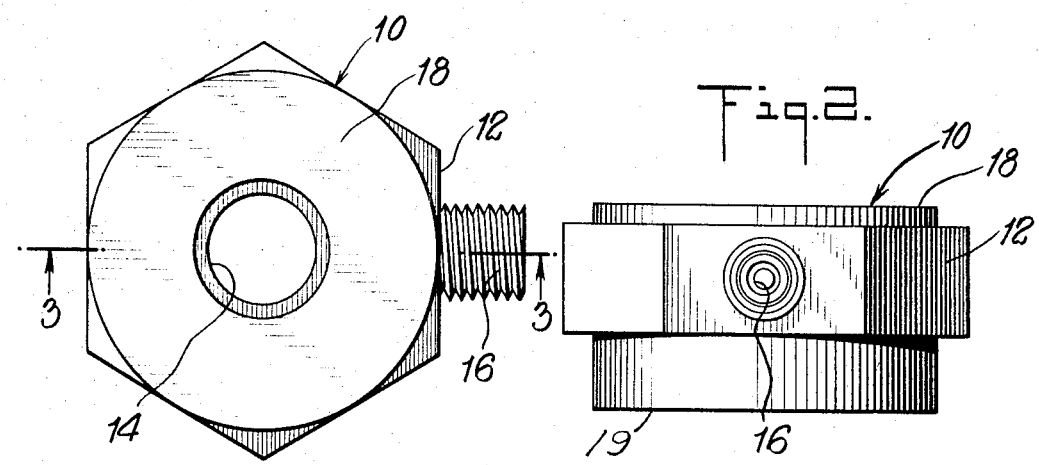
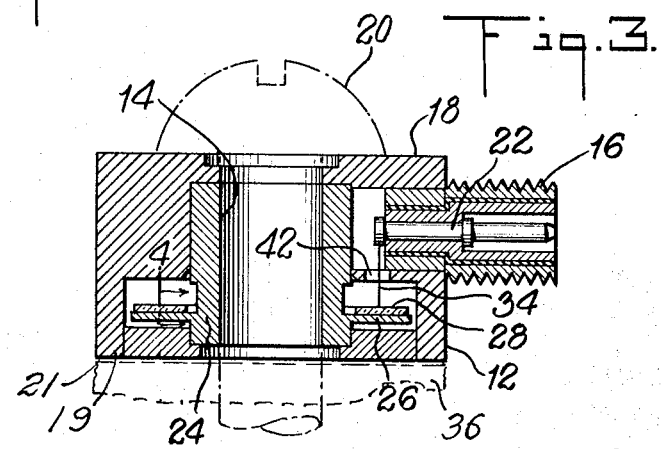
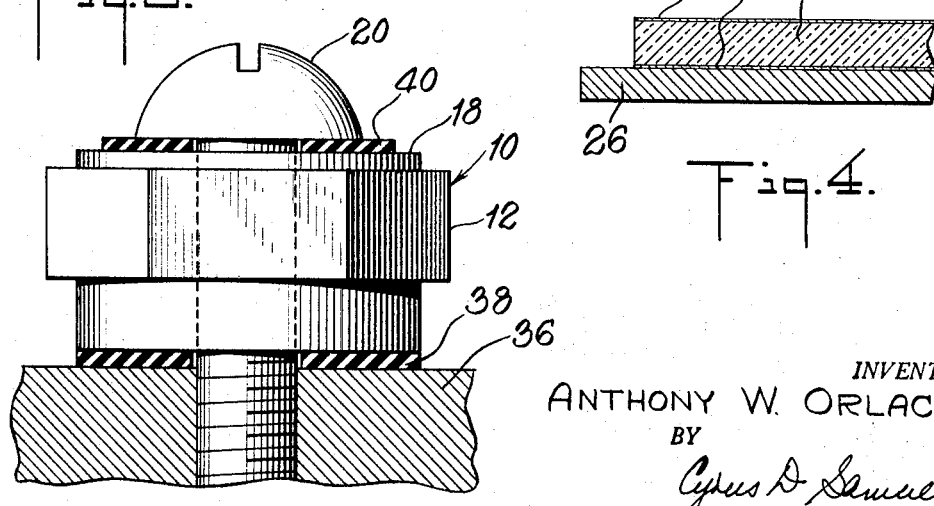
INVENTOR.
ANTHONY W. ORLACCHIO
BY
Cyrus D. Samuelson
ATTORNEY

United States Patent Office 3,359,441
Patented Dec. 19, 1967

3,359,441
ACCELEROMETER
Anthony W. Orlacchio, Fords, N.J., assignor to Gulton Industries, Inc., Metuchen, N.J., a corporation of New Jersey
Filed Nov. 16, 1959, Ser. No. 853,144
12 Claims. (Cl. 310—8.4)

My invention relates to accelerometers and more particularly to accelerometers which have an opening through the center thereof which will receive standard machine screws. It is thereby possible to mount the unit so that the connector's orientation is independent of the position of the mount and to affix the accelerometer to the device under test in openings which are threaded in almost any reasonable size and pitch.

In the prior art, accelerometers were equipped with relatively large studs since good mechanical contact between the accelerometer and the body under test must be maintained. As a consequence, it is necessary to drill special holes in the body under test and tap them to receive the accelerometer stud. Moreover, when using the prior art accelerometers it is necessary to cut off the stud if the user desires to cement the accelerometer to the body under test. On the other hand if an accelerometer is supplid without a stud there is no simple way provided for affixing it to the body under test other than by cementing it thereto.

It is an important object of my invention to provide an accelerometer which may be affixed to the body under test with standard machine screws.

It is a further object of my invention to provide such an accelerometer which can also be affixed to the body under test by cementing or gluing it thereto.

It is a still further object to provide such an accelerometer wherein the position of the connector is independent of the mount.

These and other objects, advantages, features and uses will be apparent during the course of the following description when taken in conjunction with the following drawings wherein:

FIGURE 1 is a plan view of a preferred embodiment of accelerometer of my invention, FIGURE 2 is a side elevational view of the accelerometer of FIGURE 1, FIGURE 3 is a cross-sectional view along the line 3—3 of FIGURE 1, FIGURE 4 is an enlarged detailed view in cross-section along the line 4—4 of FIGURE 3, and FIGURE 5 is an elevational view showing the accelerometer of FIGURE 1 mounted so that it is electrically insulated from the body under test.

In the drawings, wherein, for the purpose of illustration, is shown a preferred embodiment of my invention and wherein like numerals are used to designate like parts throughout the same, the numeral 10 designates an accelerometer of my invention, generally. In FIGURES 1 and 2, accelerometer 10 is seen to comprise outer housing 12 with opening 14 through the center thereof, electrical connector 16 affixed to outer housing 12 and cap 18. In FIGURES 3 and 4 there is shown inner housing 24 of brass or similar material. Flange 26 is preferably formed from the same piece of material as inner housing 24 and serves as the armature of the accelerometer.

Electromechanically sensitive element 28 is ring shaped and is preferably a piezoelectric ceramic such as barium titanate, lead titanate-zirconate or similar material. However, any other type of electromechanically sensitive body such as the magnetostrictives, natural piezoelectrics or other artificial piezoelectrics or electrostrictives may be used to carry out the teachings of my invention. Electrodes 30 and 32 are applied to element 28 in a manner well-known in the art. Element 28 is mounted on flange 26 so that electrode 32 is in intimate electrical contact with flange 26. Housing 12 is provided with hole 42 through which lead 34, which is connected to electrode 30, is fed so that it makes connection with pin 22 of connector 16. The combination is mounted to the body under test by means of screw 20 which is fed through opening 14. The head of the screw 20 may bear upon the upper surface 18 of the outer housing 12 of the accelerometer as shown in FIG. 3.

In FIGURE 5 there is shown a method of mounting accelerometer 10 to body 36, which is under test, so that the accelerometer is "ungrounded," that is, it is electrically isolated from body 36. This is accomplished by insulating housing 12 from screw 20 and body 36 by means of insulating slabs 38 and 40. Insulating slabs 38 and 40 are preferably formed of electrical insulation such as a silicone glass epoxy.

It is possible to use 6, 8 or 10 size screws to mount accelerometers of my invention which are of the usual size presently used in the art. However, it is readily apparent that smaller and larger accelerometers may be manufactured using the teachings of my invention, in which case smaller or larger size screws will be used to mount the unit to the body under test. It can also be seen that the orientation of connector 16 may be made independent of the mounting since the position of accelerometer 10 may be adjusted, as desired, and the tightening of screw 20 does not change the position of connector 16. This is not the case when the stud is a part of the accelerometer housing and the entire housing is rotated when it is being affixed to the body under test. In such circumstances, the position of the connector is determined by its position when the stud bottoms in the threaded opening in the body.

Furthermore, if no mounting openings are available in the body under test, accelerometers of my invention may be affixed to the body under test by means of a cement or glue such as type 912 manufactured by Eastman Kodak Co. or by means of double faced pressure sensitive tape such as is produced by the Permacel Corp. For this purpose, the bottom or inner surface 19 of the accelerometer is flat for substantially the entire extent of the accelerometer, to maximize the cementing area thereof, and is devoid of any downwardly extending projections which would prevent a maximum effective use of cement applied between the bottom of the accelerometer and the surface of the test body. FIG. 3 shows in dashed outline a layer of cement 21 between the accelerometer and the test body 36. The screw receiving opening 14 intersects the inner surface 19 of the accelerometer and the opening 14 at this point of intersection occupies only a small fraction of the overall area of the accelerometer, so that the flat solid area of the inner surface 19 of the accelerometer is a major portion of the included area of the accelerometer.

To assemble accelerometer 10 of the figures, element 28 is electroded and is bonded to the face of flange 26 by soldering or similar means. The element is now polarized to make it piezoelectric in a manner well-known in the art. Inner housing 24 with element 28, now piezoelectric, affixed to flange 26, is pressed into outer housing 12. Flange 26 is oriented prior to pressing inner housing 24 firmly in place so that lead 34 may be brought up to connector pin 22 through hole 42. This is best accomplished by placing hole 42 over the point at which lead 34 is affixed to electrode 30. Electrical connection from electrode 32 is made to the shell of connector 16 through flange 26, inner housing 24 and outer housing 12. Next, cap 18 is pressed in place and the unit is completely enclosed.

The accelerometer is now connected to the body under test by means of screw 20 or by bonding as heretofore described and electrical connection is made from connector 20 to the electronic equipment associated with the accelerometer. Operation and use are in the manner well-known in the art: an acceleration applied to the body under test is transmitted to the accelerometer armature. The electromechanically sensitive element is stressed thereby and the stress is converted into an electrical potential which is suitably amplified and used either as an indication of accceleration or to control other circuits or devices if a given predetermined acceleration has been attained. Obviously, the signal can also be used to control other circuits or devices if a given accceleration has not been attained.

While I have disclosed my invention in relation to a specific example and in a specific embodiment, I do not wish to be limited thereto, for obvious modifications will occur to those skilled in the art without departing from the spirit and scope of my invention.

Having thus described my invention, I claim:

1. An accelerometer comprising an outer housing, said outer housing being provided with an opening therethrough, a hollow cylindrical inner housing having an outwardly extending flange adjacent one end thereof and mounted within said opening in said outer housing, said hollow cylindrical inner housing having a central opening aligned with said opening of said outer housing and adapted to receive a mounting screw projecting through the accelerometer and threading into a test body, a ring shaped electromechanically sensitive element having electrodes on both faces thereof affixed to said flange such that electrical contact is made between one of said electrodes and said flange, and an electrical connector affixed to said outer housing and means for making electrical connections from said electrodes to said electrical connector through said flange.

2. An accelerometer as described in claim 1 wherein electrical connection between one of said electrodes and said connector is made through said inner and said outer housings.

3. An accelerometer as described in claim 1 wherein said electromechanically sensitive element is piezoelectric.

4. An accelerometer as described in claim 3 wherein said electromechanically sensitive element is largely formed of ceramic.

5. The accelerometer as described in claim 1 wherein the bottom of said outer housing has a mounting surface adapted to be cemented to a test body and which is flat for substantially the entire extent thereof and devoid of any downwardly extending projections, to provide a relatively large effective cementing area.

6. An accelerometer comprising an outer housing made of conductive material, said outer housing being provided with an opening therethrough, a hollow cylindrical inner housing made of conductive material and having an outwardly extending flange adjacent one end thereof and mounted within said opening in said outer housing and making electrical contact therewith, said hollow cylindrical inner housing having a central opening aligned with said opening of said outer housing and adapted to receive a mounting screw projecting through the accelerometer and threading into a test body, a ring shaped electromechanically sensitive element having electrodes on both faces thereof affixed to said flange such that electrical contact is made between one of said electrodes and said flange, and connector means affixed to said outer housing and having an outer casing electrically connected to said outer housing and an inner connector member insulated from said casing and electrically connected to the other of said electrodes of said sensitive element.

7. An accelerometer comprising an outer housing, said outer housing being provided with an opening extending therethrough, a hollow cylindrical inner housing having an outwardly extending flange adjacent one end thereof and mounted within said opening in said outer housing, said hollow cylindrical inner housing having a central opening aligned with said opening of said outer housing and adapted to receive a mounting screw freely projecting through the accelerometer and threading into a test body where the accelerometer can have any angular position relative to the mounting screw and the test body, a ring shaped electromechanically sensitive element having a pair of oppositely disposed faces, said element being secured to said flange, an electrical connector affixed to said outer housing, and means for making electrical connections between said electrical connector and said faces.

8. An accelerometer as described in claim 7 wherein electrical connection between one of said faces and said connector is made through said inner and outer housings.

9. An accelerometer as described in claim 7 wherein said electromechanically sensitive element is piezoelectric.

10. An accelerometer as described in claim 8 wherein said electromechanically sensitive element is largely formed of ceramic.

11. The accelerometer of claim 7 wherein said flange is anchored only at the inner periphery thereof, wherein the outer portion of the flange vibrates within the accelerometer when the accelerometer is attached to an accelerating body.

12. An accelerometer comprising a housing having an interior hollow wall portion through which extends an opening which opens onto opposite surfaces of the housing and through which is adapted to pass freely a headed mounting screw threading into a test body, wherein the accelerometer can have any angular position relative to the mounting screw and the test body, electromechanically sensitive means mounted within said housing and located around said interior hollow wall and providing an electrical signal which is a measure of acceleration when the accelerometer is attached to an accelerating test body, an electrical connector affixed to said housing, means for making electrical connections between said electrical connector and said electromechanically sensitive means, and one of said housing surfaces being at the outer end of the housing and forming a bearing surface for the head of said mounting screw, and the other of said surfaces being at the inner end of the housing and forming a mounting surface occupying a major portion of the area of the accelerometer and being flat for substantially the entire extent of the accelerometer and devoid of any inward projections, to provide a relatively large effective anchoring area for adhesively securing the accelerometer to a test body where desired.

References Cited
UNITED STATES PATENTS

| | | | |
|---|---|---|---|
| 2,488,586 | 11/1949 | Diemer | 310—8.4 |
| 2,873,604 | 2/1959 | Samsel | 310—8.4 |

MILTON O. HIRSHFIELD, *Primary Examiner.*

K. CLAFFY, J. D. MILLER, *Examiners.*

M. REICH, *Assistant Examiner.*